Patented Apr. 22, 1930

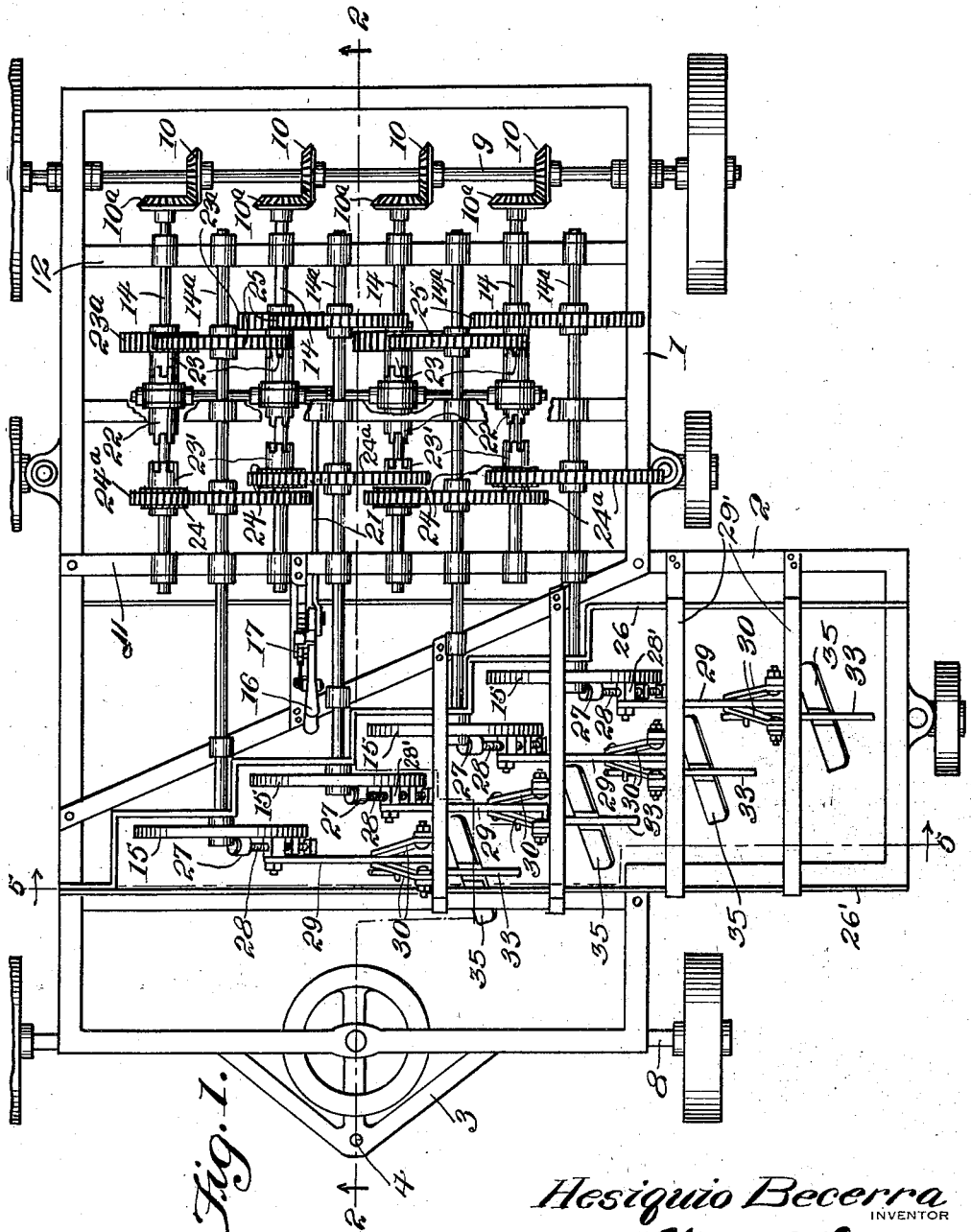

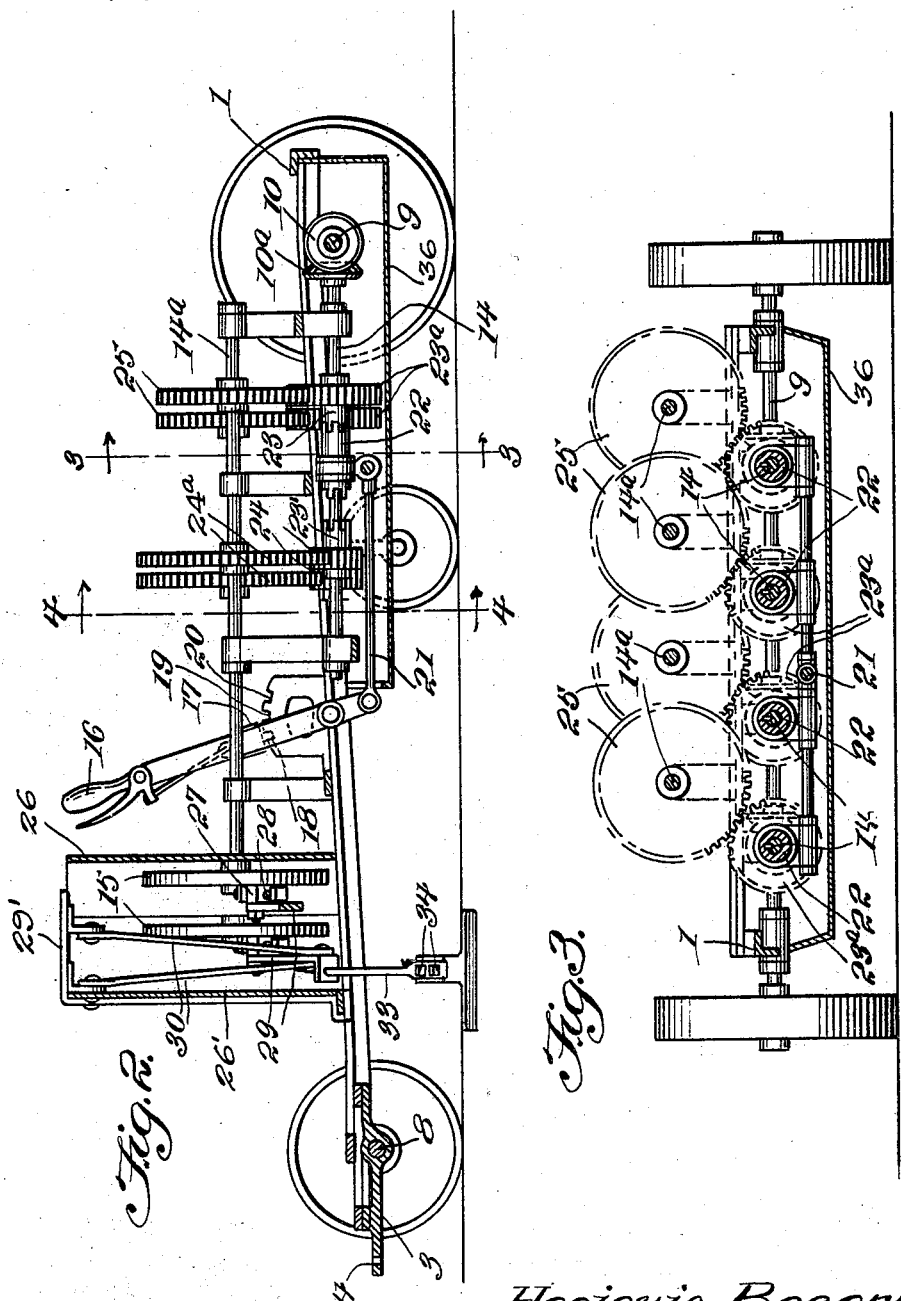

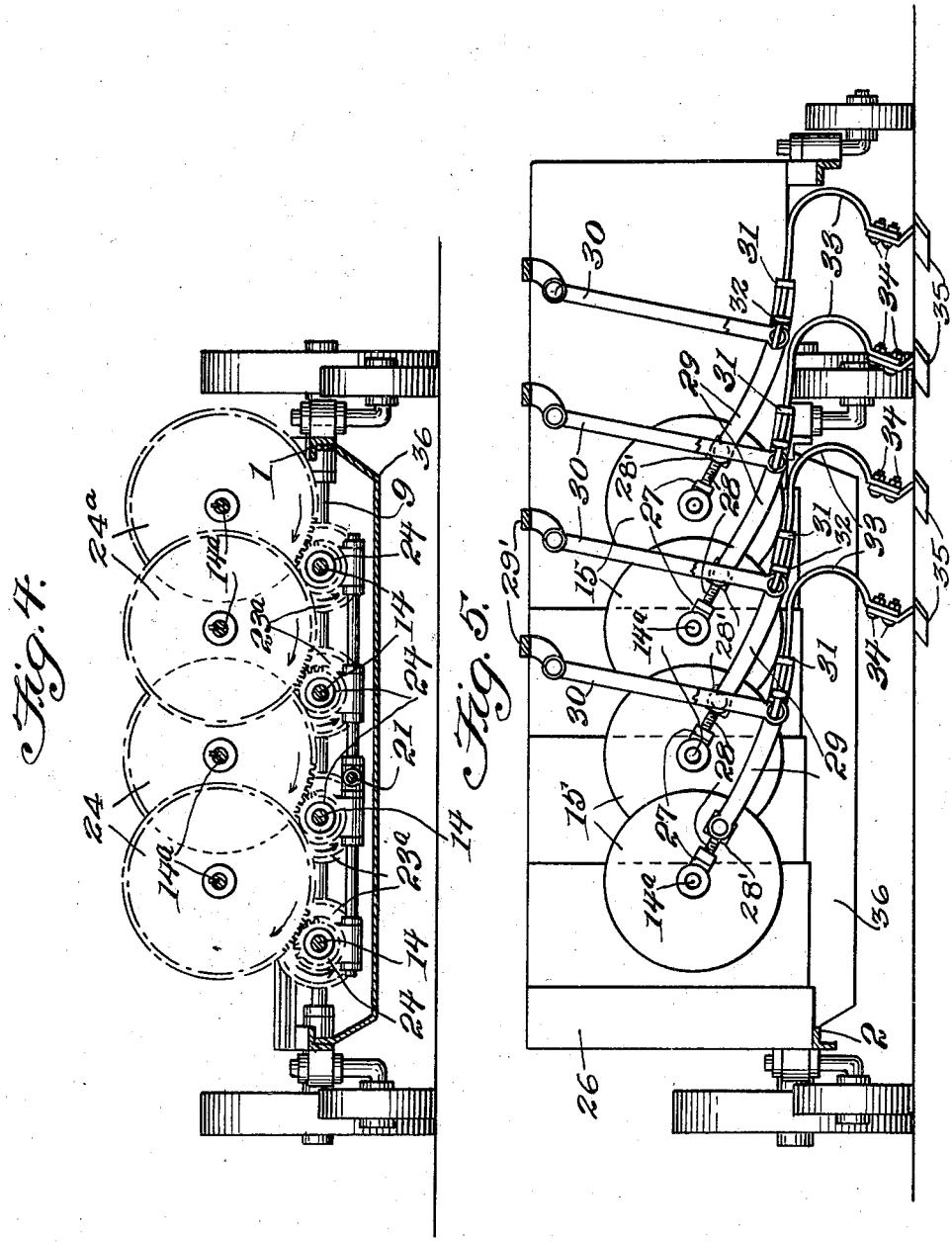

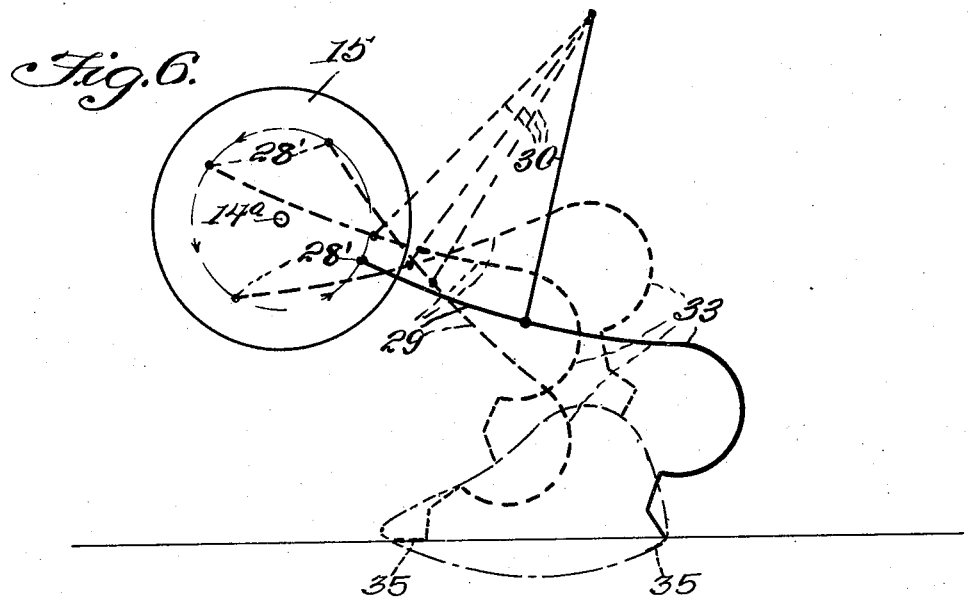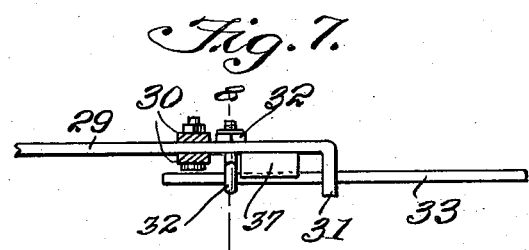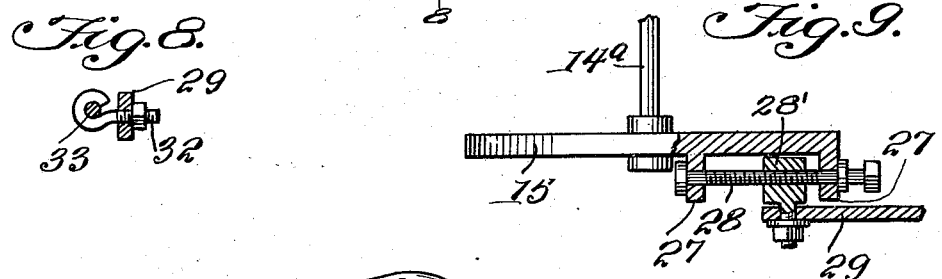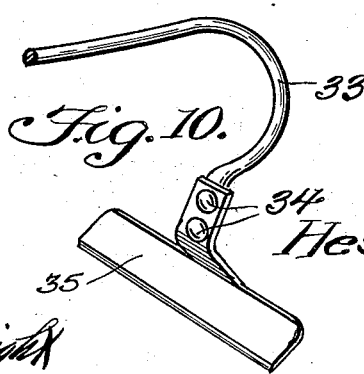

1,755,861

UNITED STATES PATENT OFFICE

HESIQUIO BECERRA, OF CHEYENNE, WYOMING

BEET BLOCKER

Application filed December 21, 1927. Serial No. 241,646.

This invention relates to machines for thinning rows of plants such as beets, cotton or the like. The seeds of beets, cotton or the like are generally sown by drills, and upon the termination of a determined period after sowing, the plants require thinning, to prevent crowding and to give them a greater volume of soil to afford proper nourishment to promote their growth. This process which is called blocking is usually accomplished by a machine that is driven over a field containing rows of plants, and the purpose of the present invention is to provide a machine of the character that includes hoe like implements which are caused to uproot certain of the plants so as to give the remaining plants sufficient room for development.

In carrying out my invention I provide a tractor drawn or horse drawn vehicle, with a set of traction wheels geared to shafts which operate rotary crank disks that in turn actuate hoes through the instrumentality of suitable mechanism, simultaneously upon a plurality of rows of plants to thin the latter. The machine also includes means by which the simultaneous action on the several rows may be conducted at variable speeds so that the thinning process may be varied in accordance with the operator's desires. I accomplish this result by a drive shaft operating sets of gears of different ratios, that are controlled by a clutch actuated lever accessible to the driver so that either a fast or slow actuation of the uprooting implements may be accomplished. The invention comprises other features, the novelty of which will be hereinafter described, and will be definitely indicated in the accompanying claims.

In the accompanying drawings illustrating my invention:—

Figure 1 is a plan view of a machine embodying my improvements;

Fig. 2 is a section on plane 2—2 of Fig. 1;

Fig. 3 is a section on the plane 3—3 of Fig. 2;

Fig. 4 is a section on the plane 4—4 of Fig. 2;

Fig. 5 is a transverse section on the plane 5—5 of Fig. 1;

Fig. 6 is a diagrammatic view illustrating the movement of one of the hoes;

Fig. 7 is a detail section illustrating a portion of one of the hoe carriers;

Fig. 8 is a section on the plane 8—8 of Fig. 7;

Fig. 9 is a section of adjusting device for the hoe; and

Fig. 10 is a detail view of a hoe detached.

Referring to the drawings in detail, the reference numeral 1 indicates the chassis frame of my machine and as shown, this frame is preferably formed of angle bars secured together in substantially rectangular form but is projected laterally at one side to provide an extension indicated by the reference numeral 2. The frame inclines downwardly and forwardly as best shown in Figure 2 and is provided at its forward end with a front axle and at its rear end with a rear axle, the latter being mounted in bearings carried by the frame and driven by traction wheels as shown.

The front axle is provided with a substantially V-shaped frame 3 that includes a bearing for receiving the front axle, and arranged at the forward end or apex of the frame 3 is a bolt hole 4 by which the machine may be hooked to a tractor or a span of horses as will be apparent.

The frame 3 has formed therewith an annular plate adapted to support a similar size annular plate formed with the forward bar of the frame 1, and a pivot pin extends through cross pieces that bridge the annular plates whereby the machine may be steered. Journaled on the front axle which is indicated by the reference numeral 8 are wheels that are relatively smaller than the traction wheels and the latter are keyed to the rear axle which is indicated by the reference numeral 9. Formed with the side bars of the frame 1, as well as with a bar of the extension 2, are ears within which are mounted for rotation stub axles that have journaled thereon wheels which cooperate with the front and rear wheels for supporting the frame.

Fixed to the rear axle 9 at spaced intervals thereon are bevel gears 10 which mesh with like bevel gears 10$^a$, and the bevel gears 10$^a$ are fixed to one of the ends of shafts 14 that are journaled in suitable bearings carried by cross bars 11 and 12. The cross bars are also provided with bearings within which are journaled shafts 14ª that are of different lengths and graduate accordingly as shown in Figure 1. While the rear ends of the shafts 14ª are disposed in alignment with each other, the opposite ends are disposed in horizontal stepped relation with respect to each other, due to the different lengths of these shafts 14ª, and secured to the last mentioned ends of the shafts 14ª are what I term crank disks 15.

Pivotally secured adjacent one of its ends to the frame, is a hand lever 16 that carries a latch 17 adapted to engage any one of a plurality of notches indicated respectively by the reference numerals 18, 19 and 20 and these notches are formed in the upper curved edge of a sector which is fixed to the frame in a manner for disposing the notches in the path of the latch as set forth. Having one of its ends pivotally secured to the lower end of the hand lever 16 is a link 21 which has its opposite end pivotally secured with respect to a rod which is arranged transversely of the frame and is secured to a plurality of clutch elements 22, there being one clutch element for each shaft 14, and these clutch elements 22 are mounted for slidable movement on the shafts 14. By this construction, it will be apparent that when the hand lever 16 is operated, the clutch elements 22 are moved in unison. Secured to the shafts 14 and 14ª are sets of low speed gears and high speed gears and the high speed gears include gears 23ª secured to the shafts 14 and which mesh with gears 25 secured to the shafts 14ª, while the high speed gears include gears 24 that are secured to the shafts 14, and gears 24ª that are secured to the shafts 14ª. The gears 23ª and 24 include hubs having clutch faces 23 and 23' respectively, and which are adapted to receive the clutch members 22, the latter being disposed in mesh with the clutch faces 23 of the gears 23ª in Figure 1. By this construction, it will be noted that when the latch 17 is disposed in the notch 19, the clutch members 22 are in neutral position with the result the mechanism of the machine is inoperative, whereby the machine can be moved from field to field or across a field without disturbing the plant life therein, but when the latch 17 is in the notch 18, the high speed gears are put into operation, and when the latch is in the notch 20, the low speed gears are put into operation.

The cross bar 11 forms a portion of the extension 2, and the side bar of the frame 1, that is arranged on the side having the extension 2, is bent at its connection with the cross bar 11, thence extended at a forward inclination, and is secured to the opposite side bar of the frame as best shown in Figure 1. This inclined portion of the said side bar has secured thereto bearings through which pass the shafts 14ª, and these shafts also pass through a vertical wall 26 of a housing which likewise includes a wall 26'. The wall 26 is arranged in horizontal stepped relation for a portion of its length as shown in Figure 1, and receives the shafts 14ª through the stepped portions thereof.

The disks 15 have formed therewith ears 27 and one of the ears is disposed adjacent the hub of its disk while the other ear of its disk is disposed at the periphery thereof as best shown in Figure 9. The ears 27 of each disk cooperate with each other and are provided with openings through which is passed one of the rods 28 that are threaded and each rod 28 receives a threaded block 28' for adjustable movement thereon as best shown in Figure 9. These blocks are formed with studs which have one of the ends of arms 29 pivotally secured thereto and held thereon through the instrumentality of nuts. The opposite ends of the arms 29 are bent at right angles upon themselves as at 31 as shown in Figure 7, and these right angle bent ends are provided with openings for a purpose which will be presently apparent. Depending from cross members 29' and having their upper ends pivotally connected thereto are links 30 arranged in pairs. A pair of links is provided for each arm 29 and have their lower ends pivotally secured upon opposite sides thereof as best shown in Figure 2.

The arms 29 have secured thereto eyed members 32 and these eyed members as well as the openings in the right angle bent ends 31 of said arms 29 have received therein for adjustable securement thereto, the straight portions of rounded shanks 33 which are curved for a portion of their length as shown in Figure 10, and have their lower ends flattened for the purpose of receiving bolt and nut connections 34 for securing the flat shanks of hoe shovels 35 thereto. The hoe shovels 35 are connected with the shanks 33 in a manner whereby they are disposed at an inclination with respect to the line of travel of the machine as best shown in Figure 1, and the movement of the hoe shovels is clearly shown in Figure 6 by full and dotted lines as well as the movement of the immediate operating means thereof, namely the shanks 33, arms 29, and disks 15. The hoe shovels are given a substantially chopping action which will remove the plants, together with their roots, from the rows.

In order to protect the gears that operate the shafts 14 and 14ª, as well as to protect the adjacent parts thereof, I employ a shield 36 in the nature of a pan which is secured to the frame 1 and has its bottom underlying the parts referred to for the purpose set forth.

It will be noted from Figure 7 that a block 37, which is grooved to receive the shank 33, is disposed between the shank and the arm 29, so that the eyed member 32 can set up a binding action between the shank 33 and block 37 for securing the shank 33 with respect to the arm 29.

From the above description and disclosure of the drawings, it will be obvious that I have provided a blocking machine that is adjustable in many respects to accomplish its thinning operation in accordance with the operator's desires, and the speed of the hoe shovels can be varied as well as the position of the shovels with respect to each other. This last mentioned adjustment is brought about by rotating the threaded rods 18 which will cause movement of the blocks 28' thereon, and this movement will result in moving the shovels accordingly. The lengths of the shafts 14ª result in the arrangement of the hoe shovels as shown in Figure 1, and it will be noted that the arrangement is such that the hoe shovels are disposed at an inclination with respect to the frame, and operate transversely thereof.

The cross members 29' not only act as means for pivotally receiving the upper ends of the links 30, but also act as guards for the hoe shovels and the immediate operating means therefor, and due to the arrangement of the hoe shovels and the means for connecting the same with respect to the disks 15, the extension 2 is necessary for the frame 1 as will be apparent.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having thus described my invention, what I claim as new and desire to secure by Letters Patent is:—

1. An agricultural machine comprising a wheeled frame, a plurality of shafts of different lengths mounted for rotation in a manner whereby at one of the ends thereof they are disposed in horizontal stepped relation with respect to each other, shafts journaled in parallelism with the shafts first mentioned, sets of low and high speed gears secured to said shafts, clutch means for putting either of the high or low speed gears into operation, a disk for each of the first mentioned shafts and secured to the stepped ends thereof, apertured ears secured to the disks and arranged in pairs with one of the ears disposed adjacent the center of its disk while the other is disposed adjacent the periphery thereof, threaded means carried by each pair of ears, a block threaded to the threaded means for adjustment thereon, arms having one of their ends pivotally secured to the blocks, depending links having connection with said arms, hoe shovels and means for adjustably securing said hoe shovels to the arms.

2. An agricultural machine comprising a rectangular frame, an extension laterally projecting from one side thereof, supporting wheels for said frame and extension respectively, cross bars included in said frame, bearings carried by said cross bars, a plurality of shafts of different lengths mounted in some of said bearings and having their forward ends arranged in horizontal stepped relation with respect to each other, shafts journaled in the remaining bearings and in parallelism with the shafts first mentioned, means for driving the last mentioned shafts from the driving wheels of the frame, means for driving the first mentioned shafts from the other shafts, means for varying the speed of the last mentioned shafts, disks secured on the last mentioned shafts and on the ends thereof that are disposed in horizontal stepped relation with respect to each other, adjustable crank means carried by said disks, arms pivotally secured to the adjustable crank means, depending means pivotally secured to said arms, and hoe shovels adjustably connected to said arms.

3. In an agricultural machine, a plurality of shafts mounted for rotation, means for rotating said shafts, means for varying the speed of said shafts, disks secured to one of the ends of said shafts, said ends being arranged in horizontal stepped relation with respect to each other, crank means formed with said disk and including ears, threaded rods mounted for rotation in said ears, blocks threadedly mounted on the threaded rods, a stud for each block, arms pivotally secured to the studs, depending links arranged in pairs and having their upper ends pivotally secured and their lower ends pivotally secured to said arms, hoe shovels, shanks having connection with said hoe shovels and means adjustably receiving said shanks for securing the latter to the arms.

In testimony whereof I affix my signature.

HESIQUIO BECERRA.